Oct. 17, 1933.  J. SINKO  1,931,093
ASH RECEIVER FOR AUTOMOBILES
Filed June 22, 1931
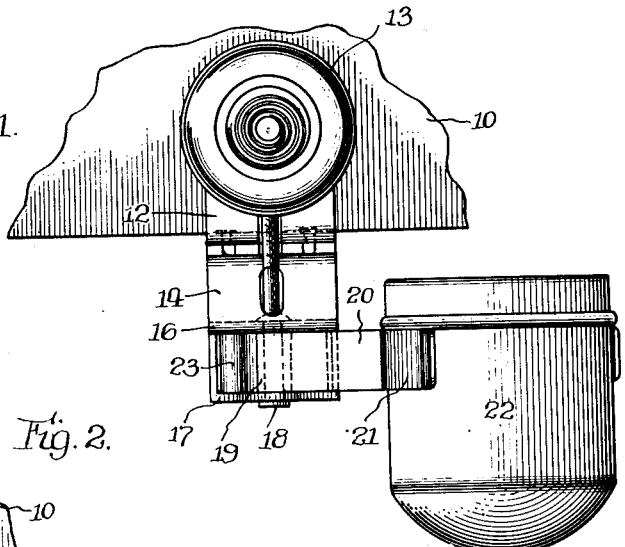
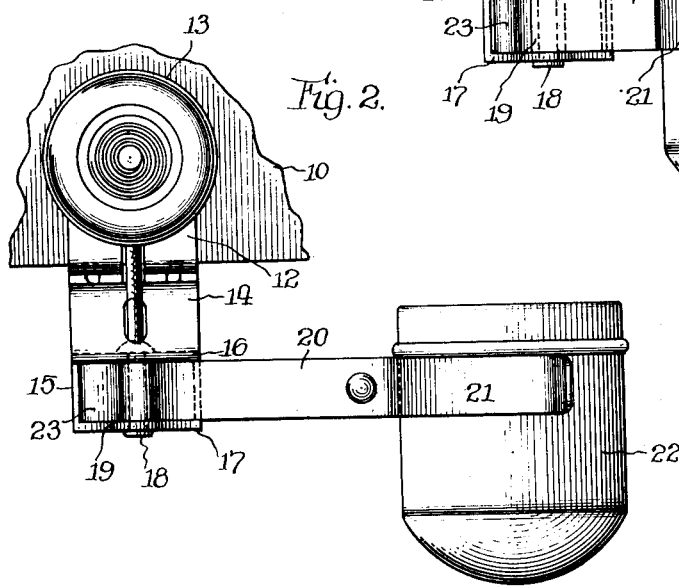
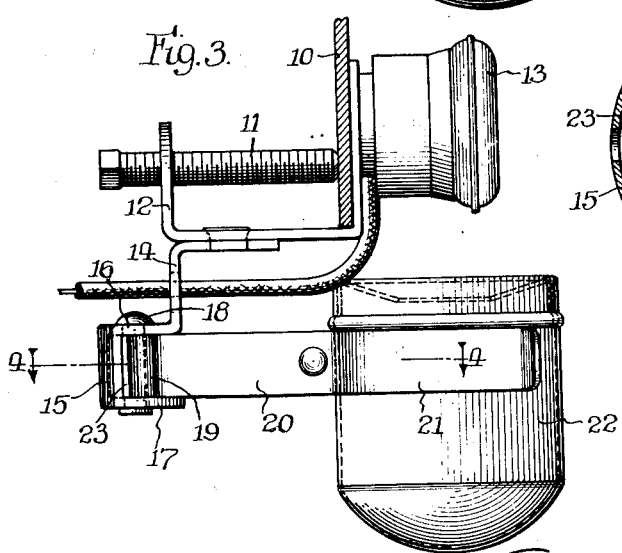
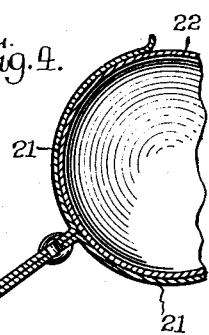
Inventor:
John Sinko,
By Fisher, Clapp, Soans & Pond, Attys.

Patented Oct. 17, 1933

1,931,093

UNITED STATES PATENT OFFICE 1,931,093

ASH RECEIVER FOR AUTOMOBILES

John Sinko, Chicago, Ill.

Application June 22, 1931. Serial No. 545,936

1 Claim. (Cl. 248—20)

The equipment of modern automobiles with such accessories as cigar and cigarette lighters has, of late, been followed by additional equipment in the nature of ash receivers, which are a convenience especially when driving in cold or inclement weather with the windows closed, and which also prevent the soiling of the car floor and seats by ashes when flicking the ashes out through an open window.

The present invention relates to a known type of ash receiver characterized by a bracket adapted for attachment to the instrument board or other part of an automobile, an arm pivotally mounted on the bracket, and a cup or tray removably supported by the free end of the arm, and one object is to provide an improved mounting for the supporting arm of the ash cup or tray that will cause the latter to remain fixed in either idle or service position, without shifting from either position under the vibration of the car.

Still other objects and attendant advantages of the invention will be apparent to persons familiar with the art from the following detailed description, taken in connection with the accompanying drawing, in which I have illustrated one simple and practical embodiment of the invention, and wherein—

Fig. 1 is a front elevation of the device in service position, shown mounted on the lower portion of the instrument board of an automobile, in association with a cigar lighter of the wireless type.

Fig. 2 is a front elevation, showing the ash cup swung rearwardly to a position behind the plane of the instrument board.

Fig. 3 is a side elevation, viewed from the left of Fig. 1, with the instrument board in vertical transverse section.

Fig. 4 is a horizontal section on the line 4—4 of Fig. 3.

Referring to the drawing, 10 indicates conventionally a fragment of the instrument board of an automobile. To the instrument board is secured, as by a clamp screw 11 (Fig. 3) a bracket, herein shown as consisting of an upright U-shaped portion 12, on the front limb of which is mounted a wireless cigar lighter 13, and a depending portion 14, attached to the lower limb of the portion 12 and lying in rear of and behind the vertical plane of the instrument board 10. The bracket portion 14 terminates at its lower end in a horizontal U-shaped member 15, the spaced arms 16 and 17 of which are apertured to receive a hinge pintle 18. Pivoted on the pintle 18 is an eye 19 (Fig. 4) formed on the rear end of a forwardly extending arm 20. This arm is preferably made from a single strip of elastic metal folded on itself and suitably shaped to provide the pivot eye 19, a two-play shank, and a cup-supporting clip.

As best shown in Fig. 4, the forward free end portion of the arm 20 is formed as a spring clamp 21 that is adapted to embrace a removable cup 22 that constitutes the ash receiver. The pivot joint of the arm 20 is given the character of a friction joint by means of a leaf spring 23 mounted in the U-shaped member 15, this spring preferably taking the form illustrated in Fig. 4, wherein it will be seen that the ends of the spring are footed against the transverse wall of the member 15, while its intermediate portion is concaved to fit and bear with friction against the eye 19, as a result of which the arm and the cup carried thereby will remain in any laterally adjusted position against any tendency of the vibration of the car to shift them from such position. By reference to Fig. 3 it will be observed that the top and bottom edges of the end portion of the arm 20 which enter the U-shaped bracket 15 fit the top and bottom limbs 16 and 17 of the bracket, which maintains the arm 20 at all times in true horizontal position and prevents both sagging of the arm and wear on the pintle 18.

When the ash receiver is not required for use, it is swung rearwardly, as shown in Fig. 2, to a position where it lies well behind the lower edge of the instrument board and practically out of sight. When required for use it is drawn forwardly to approximately the position illustrated in Figs. 1 and 3 where it is in convenient service position. The cup 22 is securely held by the spring clamp 21, but may be readily withdrawn to empty its contents, when required, and as easily replaced.

The described device forms a convenient and handy accessory for the purpose described, and, as stated, when not required for use, may be stored out of the way, and out of sight, beneath and behind the instrument board.

I claim:

In an ash receiver, the combination of a bracket formed with a horizontal U-shaped portion, an arm having at one end thereof an eye fitting between the top and bottom limbs of said U-shaped portion and at its other end a cup holder, a pivot pintle passed through said top and bottom limbs and said eye, and a leaf spring bearing at its ends against the transverse wall of said U-shaped portion and formed with an intermediate concave portion having a friction fit against said eye.

JOHN SINKO.